United States Patent
Quakkelaar et al.

(10) Patent No.: US 10,255,341 B2
(45) Date of Patent: Apr. 9, 2019

(54) MODE SWITCHING IN HIGH AVAILABILITY DISASTER RECOVERY (HADR) SYSTEMS

(71) Applicant: SAP SE, Walldorf (DE)

(72) Inventors: Rene Quakkelaar, Ter Aar (NL); Elena I. Lora Gallardo, Paris (FR)

(73) Assignee: SAP SE, Walldorf (DE)

( * ) Notice: Subject to any disclaimer, the term of this patent is extended or adjusted under 35 U.S.C. 154(b) by 236 days.

(21) Appl. No.: 15/268,651

(22) Filed: Sep. 19, 2016

(65) Prior Publication Data
US 2018/0081931 A1   Mar. 22, 2018

(51) Int. Cl.
G06F 17/30   (2006.01)
G06F 11/14   (2006.01)

(52) U.S. Cl.
CPC ........ G06F 17/30575 (2013.01); G06F 11/14 (2013.01)

(58) Field of Classification Search
CPC ......... G06F 17/30174; G06F 17/30575; G06F 17/30578; G06F 17/30581; G06F 11/14
USPC ................................ 707/609–639, 656, 658
See application file for complete search history.

(56) References Cited

U.S. PATENT DOCUMENTS

| | | | | |
|---|---|---|---|---|
| 8,341,115 | B1* | 12/2012 | Natanzon | G06F 11/1471 707/613 |
| 8,698,822 | B1* | 4/2014 | Schickler | G06F 3/1415 345/530 |
| 9,817,606 | B1* | 11/2017 | Byrne | G06F 3/065 |
| 2004/0133591 | A1* | 7/2004 | Holenstein | G06F 11/2064 |
| 2009/0313311 | A1* | 12/2009 | Hoffmann | G06F 11/2094 |
| 2010/0191884 | A1* | 7/2010 | Holenstein | G06F 11/2094 710/200 |
| 2014/0258223 | A1* | 9/2014 | Cao Minh | G06F 17/30575 707/610 |
| 2014/0258226 | A1* | 9/2014 | Noteboom | G06F 17/30377 707/615 |

* cited by examiner

*Primary Examiner* — Hares Jami
(74) *Attorney, Agent, or Firm* — Buckley, Maschoff & Talwalkar LLC (57) ABSTRACT

Various embodiments of systems, computer program products, and methods to provide mode switching in high availability disaster recovery (HADR) systems are described herein. In an aspect, an average commit wait time associated with replicating data from a primary database to a replication database is determined based on a previous average commit wait time and a current commit wait time. A counter is incremented when the average commit wait time is greater than or equal to the predefined maximum commit wait time. Further, a check is made to determine whether the counter is greater than or equal to a predefined threshold and whether a predefined timer associated with the counter is expired. When the counter is greater than or equal to the predefined threshold and the predefined timer is running, the primary database is switched from a synchronous mode to an asynchronous mode for replicating the data.

14 Claims, 5 Drawing Sheets

MODE SWITCHING IN HIGH AVAILABILITY DISASTER RECOVERY (HADR) SYSTEMS

BACKGROUND

Database systems are commonly employed by organizations to store data for easy and fast access. Accordingly, the database systems may have to be reliable and scalable. For reliability, high availability disaster recovery (HADR) systems may provide a replication scheme to recover/protect data in the event of a hardware or software failure. Therefore, the HADR systems may replicate data changes from a source database, referred to as a primary database, to a target database, referred to as a replication database. For example, when clients modify the primary database using transactions, the modifications are replicated by a replication server in the replication database. For data replication, the primary and the replication databases are synchronized. In synchronous mode, the data is copied in the primary database and the replication database over a network, and the copy is not considered complete when both copies do not succeed. To accomplish HADR and thereby zero data lost, transactions are executed in the synchronous mode. Further, the replication database can replace the primary database without loss of data when the primary database experiences failure.

In HADR systems, transactions may be committed upon receiving an acknowledgement from the replication server that applies the changes to the replicate database. It may be possible to configure a maximum commit wait time for a commit. When such timeout is reached, the primary database may have to switch towards asynchronous mode (i.e., the data in the primary database is not synchronized with the data in the replication database). Therefore, when the system is running in asynchronous mode, there can be a risk of data loss in case of failure of the primary database.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide mode switching in high availability disaster recovery (HADR) systems are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (determining, identifying, receiving, storing, retrieving, and so on) may be performed by a hardware device (e.g., computing system), even if the action may be authorized, initiated or triggered by a user, or even if the hardware device is controlled by a computer program, software, firmware, and the like. Further, it is to be understood that the hardware device may be operating on data, even if the data may represent concepts or real-world objects, thus the explicit labeling as "data" as such may be omitted.

Figure 1:
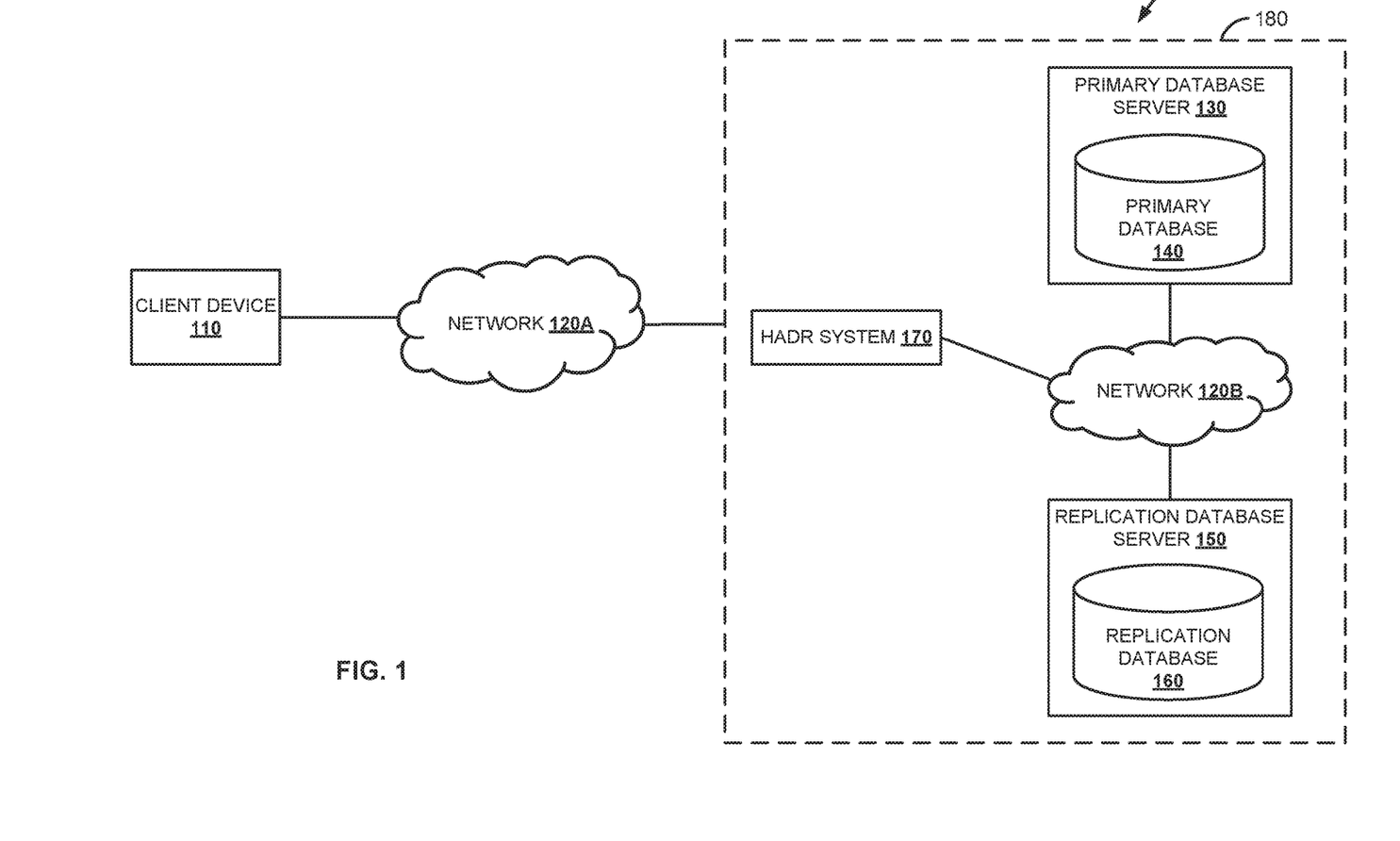
FIG. 1 is a block diagram of a computing environment illustrating a client and server system, according to one embodiment.

FIG. 1 is a block diagram of a computing environment illustrating a client and server system (e.g., 100), according to one embodiment. The client and server system 100 includes one or more client devices (e.g., 110) connected to one or more server clusters (e.g., 180) through a network (e.g., 120A). In one example, the server cluster 180 may include a primary database server (e.g., 130) connected to one or more replication database servers or standby database servers or secondary database servers (e.g., 150) through a network (e.g., 120B). The primary database server 130 may be coupled to a primary database (e.g., database 140). The replication database server 150 may be coupled to a corresponding replication database (e.g., replication database 160). In one example embodiment, there is no geographic restriction for servers (e.g., the primary database server 130 and the replication database server 150). In an example configuration, the primary database server 130 may reside in Germany and the replication database server 150 with the replication database 160 may reside in India. The networks 120A and 120B can be any network or combination of wired and wireless networks that carry data communication. Such networks can include, but are not limited to, a local area network, medium area network, and/or wide area network, such as the Internet.

Further, the client device 110 may host one or more client applications. An example of a client application can be, but is not limited to, a database application. The database application can be a computer program whose primary purpose is to enter and retrieve information from a computerized database (e.g., the primary database 140) and to facilitate simultaneous updates and queries from multiple client applications.

In one example embodiment, the server cluster 180 may host high availability disaster recovery (HADR) system 170. The HADR system 170 can be a component of the primary database server 130 and/or the replication database server 150 and/or a separate database server. Further, the HADR system 170 may be connected with multiple database servers (e.g., the primary database server 130 and the replication database server 150, as well as combinations and sub-combinations thereof). In one example, the HADR system 170 can be software, firmware, hardware or any combination thereof.

The client device 110 may send data requests to the server cluster 180, which can in turn invoke the HADR system 170 for further processing. The data received by the client device 110 is stored in the primary database 140. For example, when transaction is committed on the primary database 140, an instruction is sent to the replication database server 150 to replicate the data in the replication database 160. Upon sending the instruction to the replication database server 150 to replicate the data in the replication database 160, a timer is started. Further, upon receiving an acknowledgment from the replication database server 150 indicating successful replication, the timer is stopped. Thereby, the time taken or time elapsed to replicate the data in the replication database 160 upon writing on the primary database is referred to as a commit wait time. During the commit wait time, tasks at the primary database goes into sleep mode. In one example, when the commit wait time exceeds a predefined maximum commit wait time, the primary database 140 may have to switch from synchronous mode to asynchronous mode for replicating the data. The predefined maximum commit wait time reflects the maximum time the primary database 140 can sleep on a commit before waking up and allowing the tasks to complete on the primary database server 130. As a result of mode switching, the data in the primary database 140 and the replication database 160 may not be in sync. The switch from one mode to another mode may be referred as a spike.

In one example embodiment, to reduce the number of spikes or modes switching because of temporal slowness (e.g., network hick-ups or components not responding quickly), an average commit wait time is determined. The average commit wait time is determined based on a previous average commit wait time and a current commit wait time associated with replicating the data from primary database 140 to the replication database 160. Further, the average commit wait time is compared with the predefined commit wait time. When the average commit wait time exceeds or equal to the maximum commit wait time, a counter is incremented. The counter keeps track of the number of times the average commit wait time exceeds the predefined maximum commit wait time in a predefined timer.

In one example embodiment, when the counter reaches or exceeds a predefined threshold value and the predefined timer is on, the primary database 140 changes from the synchronous mode to the asynchronous mode corresponding to replication of the data in the replication database 160. The predefined threshold may define a threshold to be reached before switching from the synchronous mode to the asynchronous mode. The predefined timer defines a timer value to indicate when the counter to be reset back to zero.

In one example embodiment during two scenarios where when the counter is less than the threshold value and the predefined timer expires; or when the counter is greater than or equal to the threshold value and the predefined timer expires, a next average commit wait time is determined based on the determined average commit wait time upon resetting the counter and the predefined timer. In another example, when the counter is less than the predefined threshold and the predefined timer is running, the next average commit wait time is determined without resetting the counter. During these scenarios, the primary database 140 is in the synchronous mode for replicating the data in the replication database 160. Therefore, by considering the average commit wait time, the counter, the threshold and the predefined timer to decide whether to switch modes, a number of mode switches (i.e., spikes) can be reduced or flattened during replicating the data. Further, the HADR system 170 may protect against data loss by efficiently replicating data and preventing or flattening number of spikes during temporary slowdown of the network.

The client and server system 100 can be implemented on or implemented by one or more computing devices. As will be further described with respect to FIG. 5, a computing device can include one or more processors. For example, a computing device can be a computer, server, workstation, mobile device, embedded system or other device having at least one processor and memory. A computing device can include a communication port or input/output device for communicating over wired or wireless communications.

Figure 2:
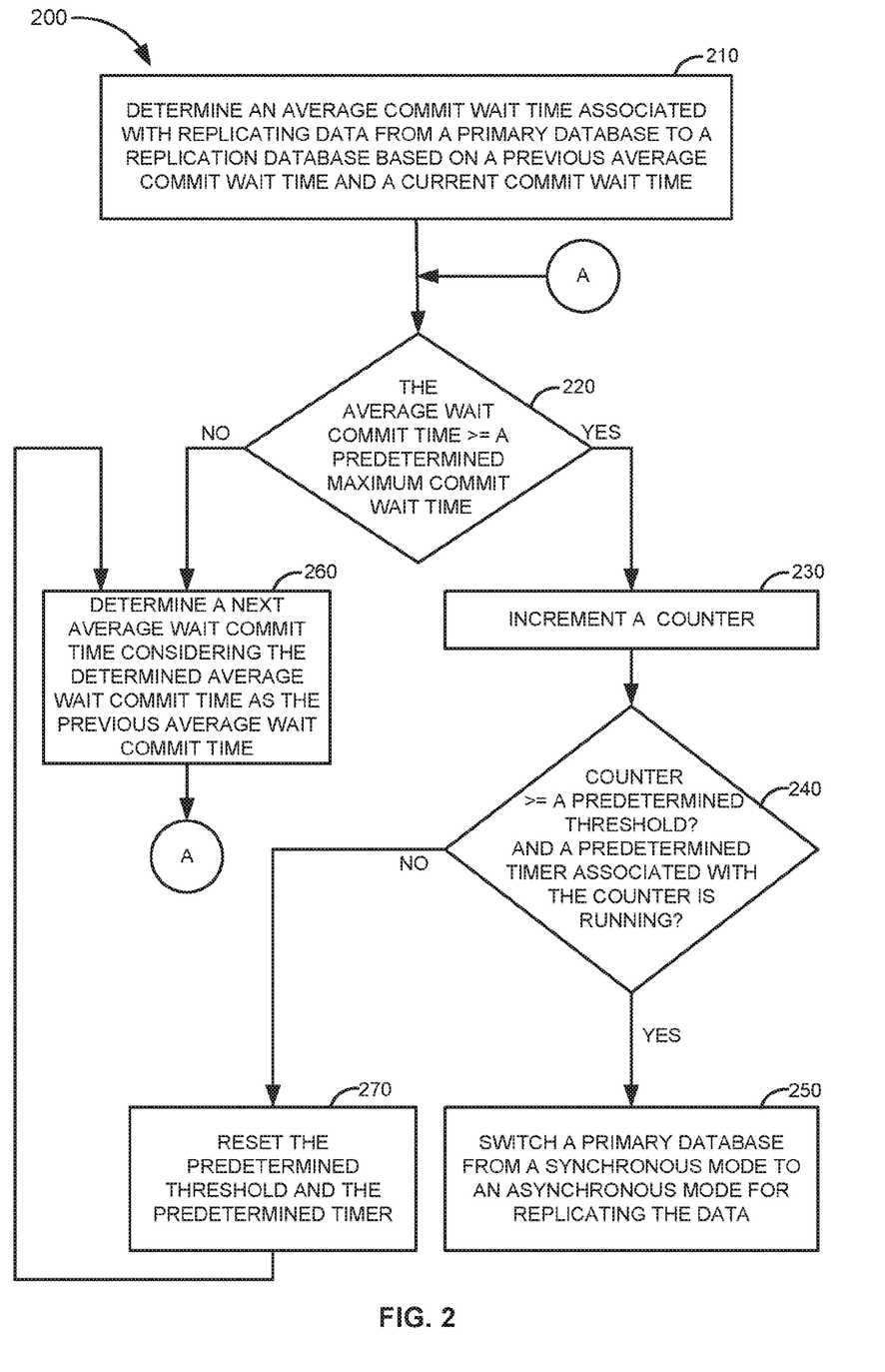
FIG. 2 is a flow diagram illustrating an example process to provide mode switching in a high availability disaster recovery (HADR) environment, according to an embodiment.

FIG. 2 is a flow diagram illustrating example process 200 to provide mode switching in a high availability disaster recovery (HADR) environment, according to an embodiment. At 210, an average commit wait time associated with replicating data from a primary database to a replication database is determined based on a previous average commit wait time and a current commit wait time. In one example embodiment, the average commit wait time is determined based on weightage factors associated with the previous average commit wait time and the current commit wait time. In one example, the weightage factor associated with the previous average commit wait time can be greater value than the weightage factor associated with the current commit wait time as the previous average commit wait time may be significant than the current commit wait time. Further, the weightage factors may be predefined by a user. For example, the weightage factor associated with the previous average commit wait time can be 0.6 and the weightage factor associated with the current commit wait time can be 0.4.

In one example embodiment, the average commit wait time is determined by summing products of previous commit wait time and the current commit wait time with respective weightage factors. For example, the average commit wait time can be determined using equation (1)

$$\text{Average commit wait time} = (\text{previous commit wait time} * \text{weightage factor associated with the previous commit wait time}) + (\text{current commit wait time} * \text{weightage factor associated with the current commit wait time}) \quad (1)$$

In one example embodiment, the previous average commit wait time is a first commit wait time when the previous average commit wait time does not exist. For example, consider no previous average commit wait time exists (e.g., a primary database is transmitting data to the replication database for a first time). A first commit wait time is 200 ms and a second or a current commit wait time is 1000 ms. In one example, the weightage factor associated with the first or previous average commit wait time is considered as 0.6 and the weightage factor associated the current commit wait time is considered as 0.4. When the primary database has to transmit for a third time, a first average commit wait is determined as in equation (2)

$$\text{First average commit wait time} = (200*0.6) + (1000*0.4) = 120 + 400 = 480 \text{ ms} \quad (2)$$

At 220, a check is made to determine whether the average commit wait time is greater than or equal to a predefined maximum commit wait time. The maximum commit wait time is predefined by the user based on, but not limited to a type of an application and past network behavior. For example, the predefined maximum commit wait time is 500 ms. In the example, the first average commit wait time is 480 ms as per equation (2). A check is made to determine whether the first average commit wait time 480 ms is greater than or equal to the predefined maximum commit wait time 500 ms. In one example embodiment, when the average commit wait time is less than the predefined maximum commit wait time, a next average commit wait time is determined considering the determined average commit wait time as a previous commit wait time, at 260. In the example, the first average commit wait time 480 ms is less than the predefined maximum commit wait time 500 ms, the first average commit wait time 480 ms is considered as the previous commit wait time. Consider a third commit wait time as 300 ms. Therefore, a second average commit wait time is determined as per equation (3)

$$\text{Second average commit wait time} = (480*0.6) + (300*0.4) = 288 + 120 = 408 \text{ ms} \quad (3)$$

Further, a check is made to determine whether the second average commit wait time 408 ms is greater than the predefined maximum commit wait time 500 ms. Since the second average commit wait time 408 ms is less than the predefined maximum commit wait time 500 ms, the second average commit wait time 408 ms is considered as the previous commit wait time.

At 230, a counter is incremented when the average commit wait time is greater than the predefined maximum commit wait time. In the example, consider a fourth commit wait time as 1000 ms. Therefore, a third average commit wait time is determined as per equation (4)

$$\text{Second average commit wait time} = (408*0.6) + (1000*0.4) = 244 + 400 = 644 \text{ ms} \quad (4)$$

In the example, the third average commit wait time 644 ms is greater than the predefined maximum commit wait time 500 ms. Thereby, the counter is incremented. At 240, a check is made to determine whether the counter is greater than or equal to a predefined threshold and whether a predefined timer associated with the counter is running. The predefined threshold may define a threshold to be reached before a switch from a synchronous mode to an asynchronous mode occur. The predefined timer defines a timer value to indicate when the counter to be reset back to zero. In one example, the predefined threshold and the predefined timer are set by a user based on, but not limited to a type of an application and network behavior. The predefined threshold can be 5 and the predefined timer can be 300 ms, for instance.

At 270, when the counter is less than the predefined threshold and the predefined timer is expired, the next average commit wait time is determined upon resetting the predefined threshold and the predefined timer. In another scenario, when the counter is greater than or equal to the threshold value and the predefined timer expires, the next average commit wait time is determined upon resetting the counter and the predefined timer. In yet another scenario, when the counter is less than the threshold value and the predefined timer is running, the next average commit wait time is determined without resetting the counter. In the example, consider the counter is 3 after incrementing and the predefined timer 300 ms is expired. Since the counter 3 is less than the predefined threshold 5, the counter is set to zero and the predefined timer is reset. Further, the process from 220 is repeated without mode switching in the primary database. Therefore, the primary database and the replication database are in sync.

At 250, a primary database is switched from the synchronous mode to the asynchronous mode when the counter is greater than or equal to the predefined threshold and the predefined timer is running or alive. Further, upon switching from the synchronous mode to asynchronous mode, the average commit wait time (e.g., the average commit wait time 644 ms) is not saved to avoid the influence of the average commit wait time on the next commit wait time. Thereby, when the mode switch occurs, the counter is reset and the corresponding average commit wait time is not stored. In the example, consider the counter is 5 after incrementing and the predefined timer 300 ms is still alive. Since the counter 5 is equal to the predefined threshold 5, the primary database is switched from the synchronous mode to asynchronous mode. Upon switching the mode, the counter is reset to zero and the corresponding average commit wait time 644 ms is not stored.

Figure 3:
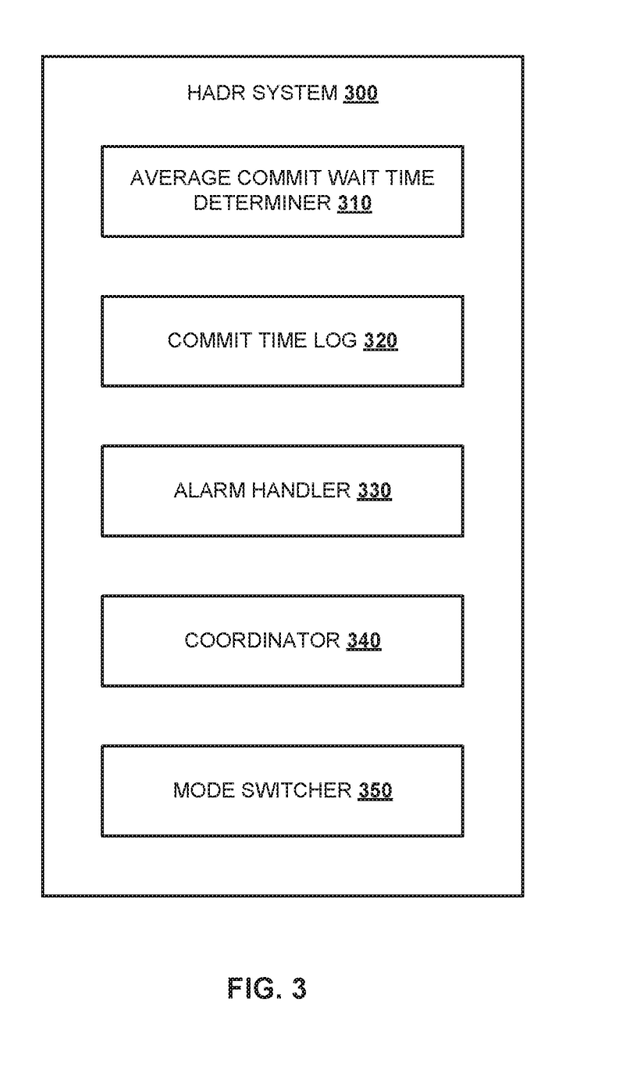
FIG. 3 is a block diagram illustrating example components of a high availability disaster recovery (HADR) system, according to an embodiment.

FIG. 3 is a block diagram illustrating example components of high availability disaster recovery (HADR) system 300, according to an embodiment. The HADR system 300 may include, but not limited to average commit wait time determiner 310, commit time log 320, alarm handler 330, coordinator 340, and mode switcher 350.

In one example embodiment, the average commit wait time determiner 310 determines an average commit wait time based on a previous average commit wait time, a current commit wait time, and weightage factors associated with the previous average commit wait time and the current commit wait time. Further, commit wait times (e.g., the previous commit wait time, the current commit wait time, a first commit wait time and the like) are recorded and stored in the commit time log 320 for determining the average commit wait time as described in 210 of FIG. 2. Further, a check is made to determine whether the average commit wait time is greater than or equal to a predefined maximum commit wait time. When the average commit wait time is greater than or equal to the predefined maximum commit wait time, a counter is incremented.

In one example embodiment, when the counter is less than the predefined threshold and the predefined timer is expired, or when the counter is greater than the predefined threshold and the predefined timer is expired, the predefined threshold and the predefined timer are reset by the alarm handler 330. The alarm handler 330 may use the predefined timer (e.g., 300 ms) to wake-up the coordinator 340. When the coordinator 340 receives a wake-up, the coordinator 340 resets the predefined timer (e.g., to predefined timer's configured value) and the coordinator 340 resets the counter (e.g., the counter keep track of number of times the average commit wait time is greater than or equal to the predefined maximum commit wait time) to zero, without a switch from a synchronous mode to an asynchronous mode. In one example embodiment, the mode switcher 350 may switch a primary database from the synchronous mode to the asynchronous mode when the counter is greater than or equal to the predefined threshold and the predefined timer is running or alive.

Figure 4:
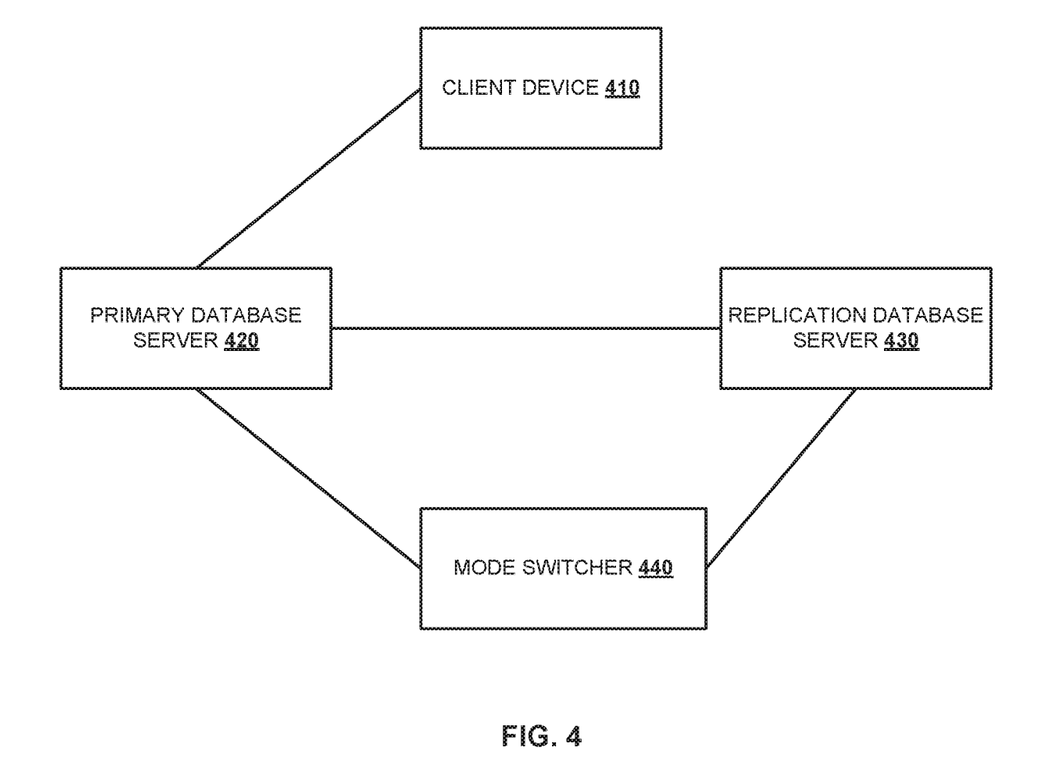
FIG. 4 illustrates an example high availability disaster recovery (HADR) environment, according to an embodiment.

FIG. 4 illustrates an example high availability disaster recovery) (HADR) environment, according to an embodiment. In an example, primary database server 420 is logically connected with a replication database server 430. The replication database server 430 replicates data from the primary database server 420. In operation, the primary database server 420 can be in an active state and can process transactions originated from client device 410. Further, the client device 410 may send transaction requests to the primary database server 420 via a dispatcher and an Open Database Connectivity (ODBC) layer, for instance.

In one example embodiment, mode switcher 440 decides to switch modes (e.g., from a synchronous mode to asynchronous mode) in the primary database server 420 based on an average commit wait time. Upon determining the average commit wait time, a check is made to determine whether the average commit wait time is greater than or equal to a predefined maximum commit wait time. Further, a counter is incremented when the average commit wait time is greater than the predefined maximum commit wait time. Further, a check is made to determine whether the counter is greater than or equal to a predefined threshold and whether a predefined timer associated with the counter is running.

When the counter is less than the predefined threshold and the predefined timer is expired, or when the counter is greater than or equal to the predefined threshold and the predefined timer is expired, the predefined threshold and the predefined timer are reset and a next average commit wait time is determined. When the counter is greater than or equal to the predefined threshold and the predefined timer is running or alive, a primary database server 420 is switched from the synchronous mode to the asynchronous mode for replicating the data.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 5:
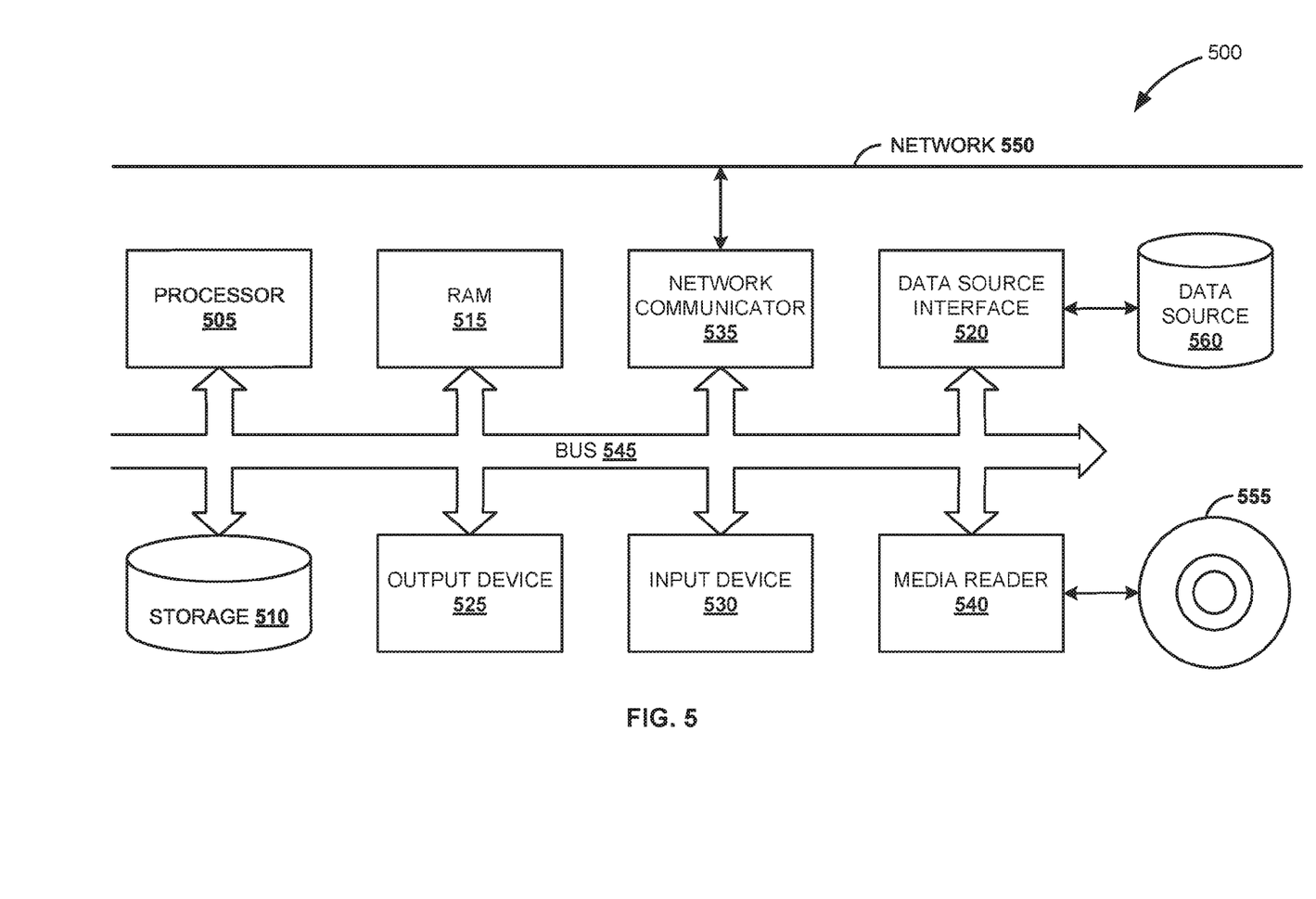
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
    determine an average commit wait time associated with replicating data from a primary database to a replication database based on a previous average commit wait time and a current commit wait time by summing products of the previous average commit wait time and the current commit wait time with respective weightage factors;
    determine whether the average commit wait time is greater than or equal to a predefined maximum commit wait time;
    increment a counter when the average commit wait time is greater than or equal to the predefined maximum commit wait time;
    determine whether the counter is greater than or equal to a predefined threshold and whether a predefined timer associated with the counter is expired; and
    switch the primary database from a synchronous mode to an asynchronous mode for replicating the data when the counter is greater than or equal to the predefined threshold and the predefined timer is running.

2. The non-transitory computer-readable medium of claim 1, the operations further comprising instructions causing the computer to: determine a next average commit wait time considering the determined average commit wait time as a previous commit wait time when the average commit wait time is less than the predefined maximum commit wait time.

3. The non-transitory computer-readable medium of claim 1, the operations further comprising instructions causing the computer to:
    determine a next average commit wait time upon resetting the counter, while the primary database is in the synchronous mode for replicating the data, when:
        the counter is less than the predefined threshold and the predefined timer is expired; or
        when the counter is greater than or equal to the predefined threshold and the predefined timer is expired.

4. The non-transitory computer-readable medium of claim 1, the operations further comprising instructions causing the computer to:
    determine a next average commit wait time without incrementing the counter when the counter is less than the predefined threshold and the predefined timer is running, while the primary database is in the synchronous mode for replicating the data.

5. The non-transitory computer-readable medium of claim 1, wherein the previous average commit wait time is a first commit wait time when the previous average commit wait time does not exist.

6. A computer implemented method to provide mode switching in a high availability disaster recovery (HADR) system, comprising:
    determining an average commit wait time associated with replicating data from a primary database to a replication database based on a previous average commit wait time and a current commit wait time by summing products of the previous average commit wait time and the current commit wait time with respective weightage factors;
    determining whether the average commit wait time is greater than or equal to a predefined maximum commit wait time;
    incrementing a counter when the average commit wait time is greater than or equal to the predefined maximum commit wait time;
    determining whether the counter is greater than or equal to a predefined threshold and whether a predefined timer associated with the counter is expired; and
    switching the primary database from a synchronous mode to an asynchronous mode for replicating the data when the counter is greater than or equal to the predefined threshold and the predefined timer is running.

7. The computer implemented method of claim 6, further comprising:
    determining a next average commit wait time considering the determined average commit wait time as a previous commit wait time when the average commit wait time is less than the predefined maximum commit wait time.

8. The computer implemented method of claim 6, further comprising:
    determining a next average commit wait time upon resetting the counter, while the primary database is in the synchronous mode for replicating the data, when:

the counter is less than the predefined threshold and the predefined timer is expired; or when the counter is greater than or equal to the predefined threshold and the predefined timer is expired.

9. The computer implemented method of claim 6, further comprising:

determining a next average commit wait time without incrementing the counter when the counter is less than the predefined threshold and the predefined timer is running, while the primary database is in the synchronous mode for replicating the data.

10. The computer implemented method of claim 6, wherein the previous average commit wait time is a first commit wait time when the previous average commit wait time does not exist.

11. A computing system, comprising:

at least one processor; and one or more memory devices communicative with the at least one processor, wherein the one or more memory devices store instructions to:

determine an average commit wait time associated with replicating data from a primary database to a replication database based on a previous average commit wait time and a current commit wait time by summing products of the previous average commit wait time and the current commit wait time with respective weightage factors;

determine whether the average commit wait time is greater than or equal to a predefined maximum commit wait time;

increment a counter when the average commit wait time is greater than or equal to the predefined maximum commit wait time;

determine whether the counter is greater than or equal to a predefined threshold and whether a predefined timer associated with the counter is expired; and switch the primary database from a synchronous mode to an asynchronous mode for replicating the data when the counter is greater than or equal to the predefined threshold and the predefined timer is running.

12. The computing system of claim 11, further comprising instructions to:

determine a next average commit wait time considering the determined average commit wait time as a previous commit wait time when the average commit wait time is less than the predefined maximum commit wait time.

13. The computing system of claim 11, further comprising instructions to:

determine a next average commit wait time upon resetting the counter, while the primary database is in the synchronous mode for replicating the data, when:

the counter is less than the predefined threshold and the predefined timer is expired; or when the counter is greater than or equal to the predefined threshold and the predefined timer is expired.

14. The computing system of claim 11, further comprising instructions to:

determine a next average commit wait time without incrementing the counter when the counter is less than the predefined threshold and the predefined timer is running, while the primary database is in the synchronous mode for replicating the data.

* * * * *